(12) United States Patent
Kim

(10) Patent No.: US 6,182,480 B1
(45) Date of Patent: Feb. 6, 2001

(54) LOCKING SYSTEM OF THE TAPE STORAGE CASE FOR BURGLARPROOF OF THE ENCLOSED TAPE

(76) Inventor: Jae Tae Kim, 2757 The Mews Ct., Northbrook, IL (US) 60062

( * ) Notice: Under 35 U.S.C. 154(b), the term of this patent shall be extended for 0 days.

(21) Appl. No.: 09/332,855

(22) Filed: Jun. 14, 1999

(30) Foreign Application Priority Data

Jun. 13, 1998 (KR) .................................................. 98-22124

(51) Int. Cl.[7] .................................................. E05B 65/00
(52) U.S. Cl. .................................. 70/57.1; 70/63; 206/1.5
(58) Field of Search .................................. 70/57.1, 58, 63; 205/1.5, 308.2, 387.11

(56) References Cited

U.S. PATENT DOCUMENTS

| | | | |
|---|---|---|---|
| 1,510,632 | * | 10/1924 | Nutry ........................................ 70/63 |
| 3,125,873 | * | 3/1964 | Robinson .................................. 70/63 |
| 3,613,413 | * | 10/1971 | Glass et al. ............................ 70/63 X |
| 3,659,442 | * | 5/1972 | Cellini et al. ............................ 70/63 |
| 4,469,225 | * | 9/1984 | Takahashi ............................ 70/63 X |
| 4,662,664 | * | 5/1987 | Wendt et al. ......................... 70/63 X |
| 5,129,244 | * | 7/1992 | Wittman ............................... 70/63 X |
| 5,598,728 | * | 2/1997 | Lax .................................... 70/57.1 X |
| 5,680,782 | * | 10/1997 | Komatsu et al. ...................... 70/57.1 |
| 5,782,350 | * | 7/1998 | Weisburn et al. .................... 70/63 X |
| 5,901,840 | * | 5/1999 | Nakasuji ................................ 206/1.5 |
| 5,934,114 | * | 8/1999 | Weisburn et al. ...................... 70/57.1 |
| 5,956,981 | * | 9/1999 | Weisburn et al. ...................... 70/57.1 |

* cited by examiner

*Primary Examiner*—Suzanne Dino Barrett
(74) *Attorney, Agent, or Firm*—Knobbe, Martens, Olson & Bear, LLP

(57) ABSTRACT

Disclosed is a locking system for cassette tape cases to prevent tapes from being stolen and to discourage theft of cases as well. A cassette tape case has configurations to lock with a locking device. The locking device case has a plate and a plurality of protrusions configured to couple with the configurations of the cassette tape case. The locking device also has slits for use in unlocking the cassette tape case. Also disclosed is an apparatus to unlock the locked cassette tape case. The unlocking apparatus includes a plurality of keys configured to be inserted into the slits of the locking device.

10 Claims, 6 Drawing Sheets

LOCKING SYSTEM OF THE TAPE STORAGE CASE FOR BURGLARPROOF OF THE ENCLOSED TAPE

BACKGROUND OF THE INVENTION

1. Field of the Invention

The present invention relates to a system for locking a tape storage case to prevent the enclosed tape from being stolen from the case, and discourage the theft of the case itself. Specifically, the present invention relates to a system for locking the tape storage case, comprised of a tape storage case, a lock plate for locking the storage case and an opening key fixture for releasing the lock plate. Only the key fixture can release the lock plate and, therefore, only an individual possessing the key fixture can get the enclosed tape out the case. Furthermore, the lock plate may be fitted with a device which will trigger electronic surveillance systems should one attempt to pass through such surveillance system while the lock plate is still attached to the tape storage case.

2. Description of the Prior Art

A tape, i.e., cassette tape or video tape, is a media which is widely used for audio and video recording. Usually, the recorded tape is kept in a tape storage case which is displayed standing on the shelf.

The conventional tape storage case is comprised of a case body and the attached cover, both usually made of plastic. The tape can be enclosed within the case body. The cover opens from the flexible case body binding where it is attached, much like a book cover. The cover opens and closes easily and anyone can simply raise the cover and access the tape within in the case body. For this reason, there is a high risk of the tape being removed from the case without authorization.

Often the case body will contain an electronic alarm label as individuals may attempt to take the tape while it still within the case body. In this situation, the electronic alarm label within the case body should activate an electronic security system and the store clerk will be aware of the attempted theft. The alarm label, however, is easily removable from the case body when the store clerk is not watching.

Further, a sensor or a locking device is provided with the out surface of the conventional tape storage case, and thus, it is very difficult to display the case by standing on the shelf.

SUMMARY OF THE INVENTION

Accordingly, the present invention has been made keeping in mind the above problems occurring in the prior art, and an object of the present invention is to provide a locking system for preventing unauthorized individuals from removing the enclosed tape from the tape storage case.

Further, the present invention also provides a locking system which would preventing unauthorized individuals from taking the enclosed tape without removing the tape from the case body by simply removing the electronic alarm label from the case body and then taking the case body with the tape inside.

In order to accomplish the above object, the present invention provides a system for locking the tape storage case, comprising: a tape storage case for enclosing a tape, having a cover and a case body wherein joint holes are provided at the main sides of the cover and the case body, so that the joints holes form a single hole penetrating the overlapped the main sides; a locking plate for locking the tape storage case, having protrusions which are inserted to the joint holes to lock the case; and an opening key fixture for unlocking the locking plate, having keys which are inserted into the key holes of the locking plate to release the locking plate from the case.

In the preferred embodiment of the present invention, the locking plate has the size and the width to fit the main side of the case.

In another preferred embodiment, the center of the protrusions is divided perpendicularly such that the protrusions has inward and outward flexibility, and the tapered locking face is provided at the ends of the protrusions, and the tapered releasing face is provided at the other ends of the protrusions in the opposite shape.

In another preferred embodiment, the key holes are two semicircles surrounding the protrusions.

In another preferred embodiment, an electronic alarm label is attached inside of the locking plate and said electronic alarm will sound if the locking plate is passed an electronic surveillance system.

BRIEF DESCRIPTION OF THE DRAWINGS

The above mentioned features, and other objects, features and advantages of the present invention will be more clearly understood from the following detailed description taken in conjunction with the accompanying drawings, in which.

DESCRIPTION OF THE PREFERRED EMBODIMENTS

Figure 1:
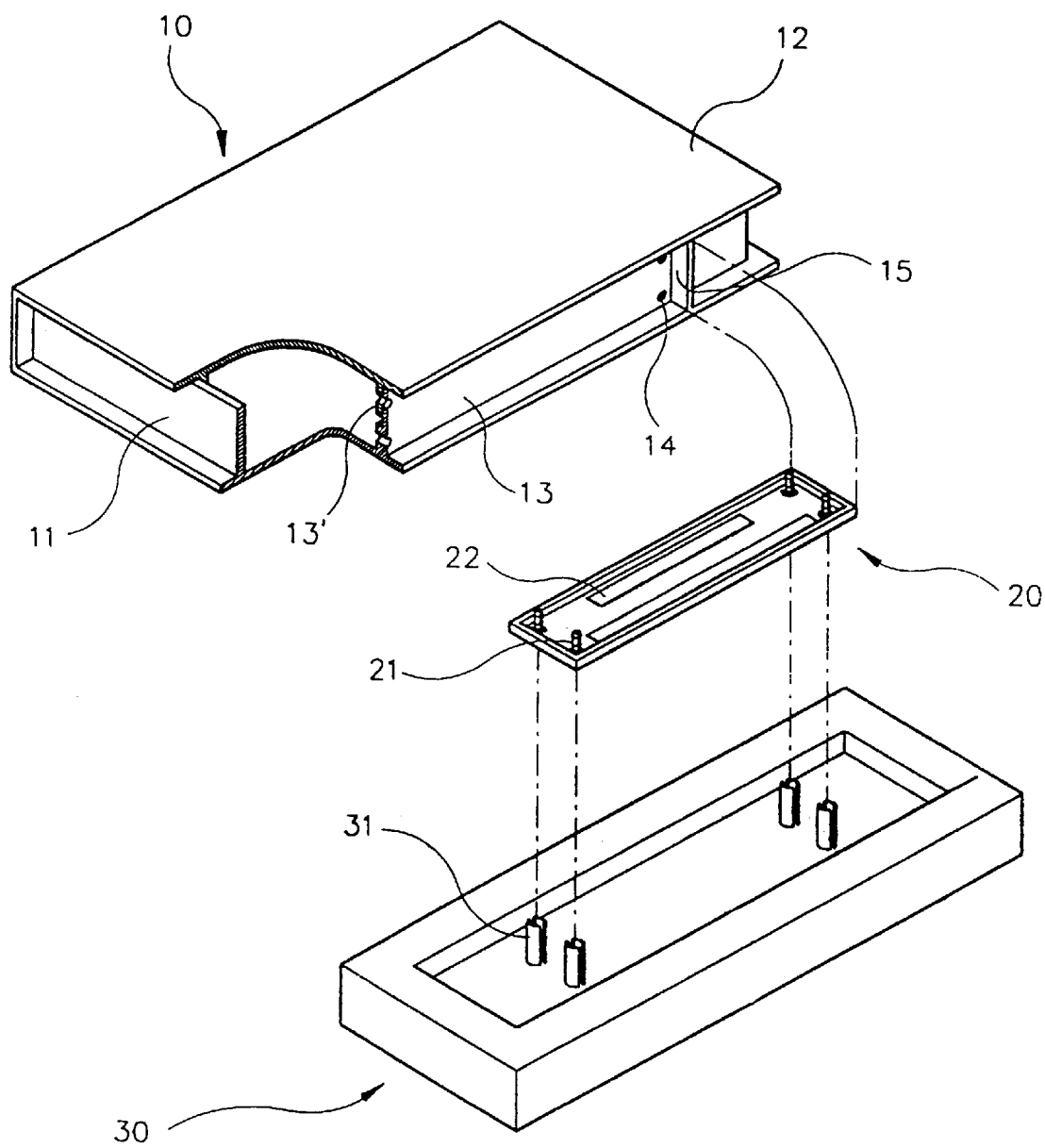
FIG. 1 is a perspective view of a locking system of the present invention before the locking plate has been attached to the tape storage case.

FIG. 1 is a perspective view of a locking system of the present invention, comprised of a tape storage case 10, a locking plate 20 for locking the tape storage case 10 and an opening key fixture 30 for unlocking the plate 20. The closed tape storage case 10 is shown in FIG. 1. The tape storage case 10 comprises a case body 11 and a cover 12. A tape is enclosed in the case body 11. The main side 13 of the case body 11 and the main side 13' of the cover 12 are overlapped when the case 10 is closed. When the case is closed, the joint holes 14 should coincide so that they form a single hole penetrating the overlapped main sides 13, 13'.

Figure 2:
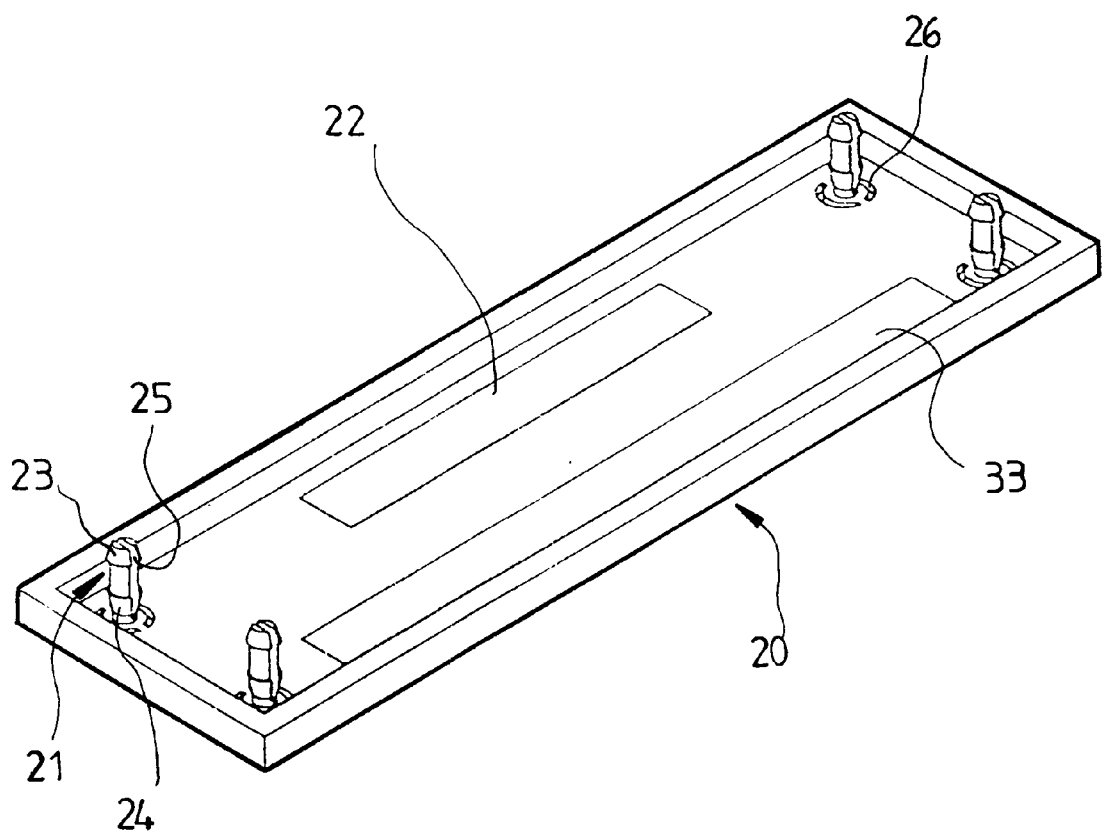
FIG. 2 is a perspective view of the locking plate of the present invention.

As shown in FIG. 2, the locking plate 20 is provided with the protrusions 21 which are inserted into the joint holes 14.

The locking plate 20 is also provided with the key holes 26 which are two semicircles surrounding the protrusions 21. An electronic alarm label 22 may be attached inside of the lock plate 20. A barcode label 33 also may be attached inside of the lock plate 20. The locking plate 20 has the size and the width to fit with the main side of the case 10 between the guarding tabs 15, 15'

For the details relating to the shape and the configuration of the locking plate, Korean design application No. 98-9544 and U.S. Design Patent application No. 29/097,618 may be referenced.

The center 25 of the protrusions 21 is divided perpendicularly such that the protrusions 21 have inward and outward flexibility. The tapered locking face 23 is provided at the ends of the protrusions 21. The tapered releasing face 24 is provided at the other ends of the protrusions 21 in the opposite shape.

As shown in FIG. 1, the opening key fixture 30 is molded to accommodate the main side of the case 10. The opening key fixture 30 is provided with the keys 31 which are hollow shafts divided into two parts. The location of keys 31 on the opening key fixture correspond with the location of the key holes 26 on the locking plate 20. The keys 31 are inserted into the key holes 26 so that the keys 31 cause the protrusions 21 to pull out from the joint holes 14.

Figure 3A:
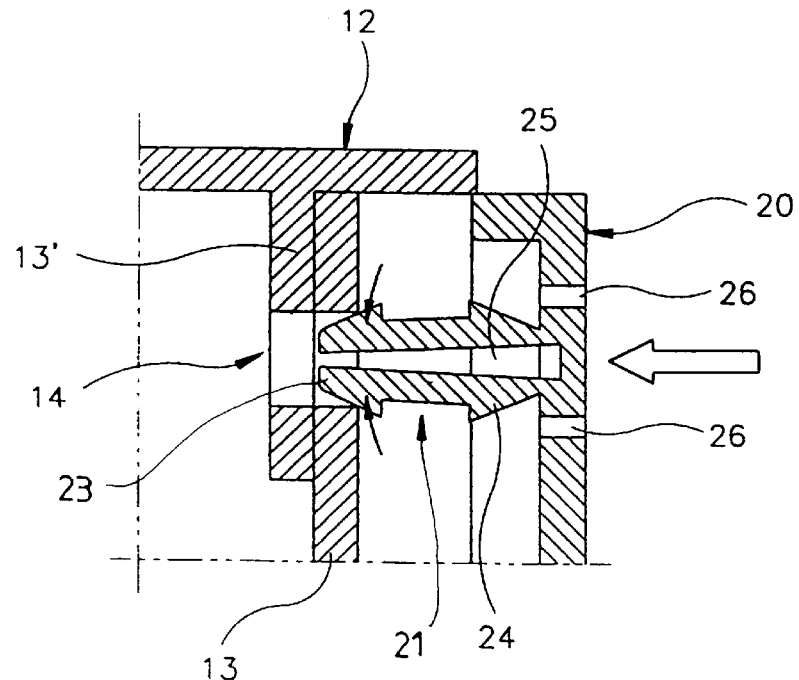
FIG. 3a is a partial sectional view which shows the protrusions of the locking plate before it is inserted into the joint holes of the case.
Figure 3B:
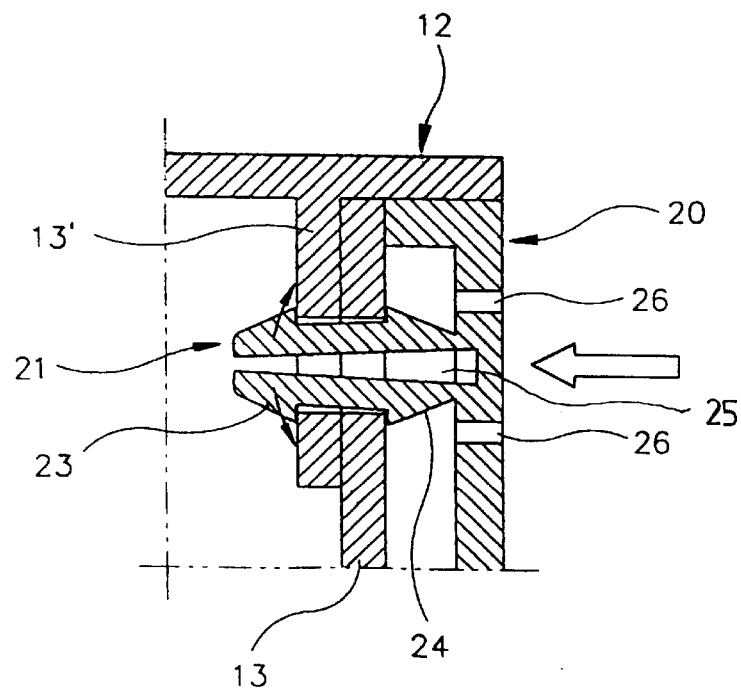
FIG. 3b is a partial sectional view which shows the protrusions of the locking plate after it is inserted into the joint holes of the case.

Referring to FIGS. 3a and 3b, the protrusions 21 being inserted into the joint holes 14 is shown. To lock the case 10, the joint holes 14 of the main sides 13, 13' of the case body 11 and cover 12 should be aligned so that the protrusions 21 can penetrate the joint holes 14. When the locking plate 20 is pushed, then the tapered locking face 23 of the protrusions 21 is squeezed into the joint holes 14 with the narrowing the divided center 25 of the protrusions 21 as shown in FIG. 3a.

Figure 4:
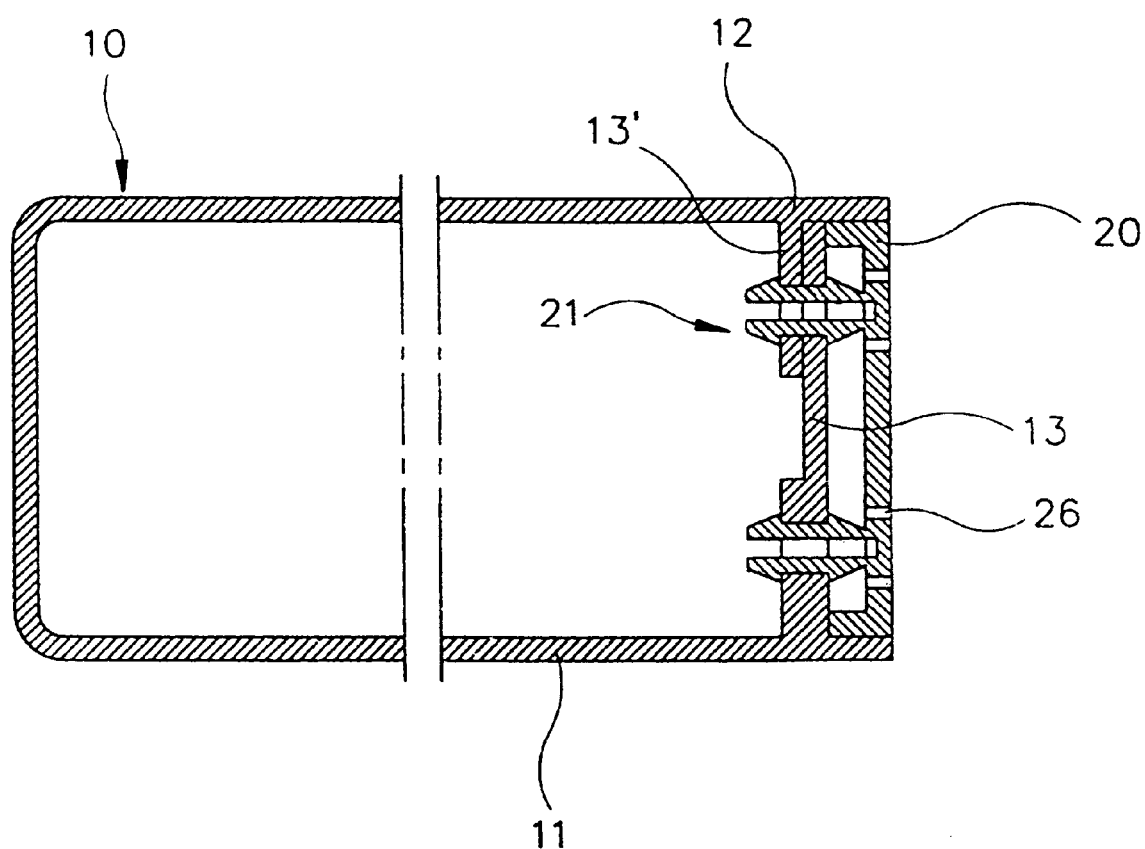
FIG. 4 is a sectional view of a locking system of the present invention after the locking plate is assembled with the tape storage case.

After being inserted into the joint holes 14, the tapered locking face 23 returns to its initial position as shown in FIGS. 3b and 4 since the protrusions 21 has elasticity outwardly. Therefore, the locking plate 20 can not be pull out without using the opening key fixture 30 and the case 10 can not be opened. Therefore, an individual may not remove the locking plate 20 without the opening key fixture 30 and thus, no one can open the case 10 without authorization.

The tapered releasing face 24 of the protrusions 21 prohibits the protrusions 21 from further entering the joint holes 14.

The locking plate 20 has the size and the width to fit the main side of the case 10. Therefore, the locking plate 20 is within the outer boundary of the case, and thus, the case 10 will take up minimal space as it is displayed on the shelf.

The guarding tab 15, 15' is provided at the main side 13 of the case body 11 and the locking plate 20 is located between the guarding tabs 15, 15' when the plate 20 locks the case 10. In this way, the protrusions 21 are prevented from being lifted or cut from the case body 11 by any sharp tool, i.e. knife through the gap between the main side 13 of the case 10 and the plate 20.

An alarm label 22 may be attached at the inside of the lock plate 20 to protect it from being removed or damaged. If an unauthorized individual carries out the case 10 without removing the plate 20, then the alarm label attached in the inside of the lock plate 20 will sound and thus, theft of the case 10 will be prevented.

FIG. 4 shows a sectional view of the locking system after the locking plate 20 is assembled with the case 10.

Figure 5A:
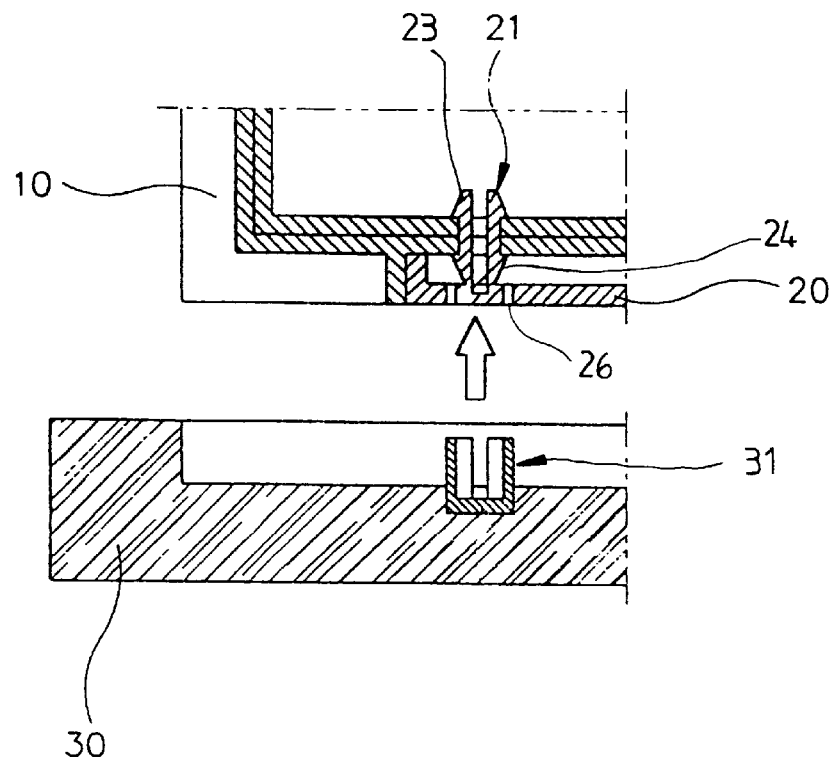
FIG. 5a is a partial sectional view which shows the protrusions of the locking plate and the key of the opening key fixture before the key is inserted into the key holes of the locking plate.
Figure 5B:
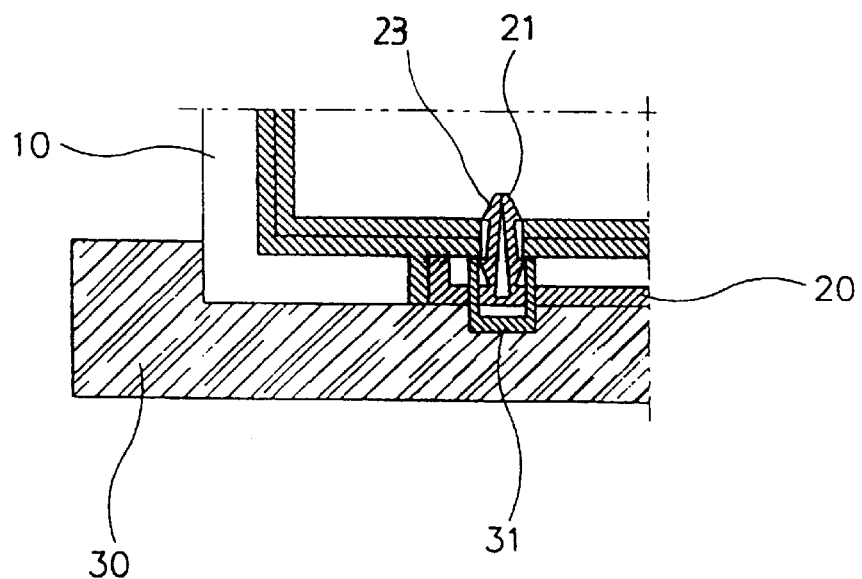
FIG. 5b is a partial sectional view which shows the key being inserted into the key holes of the locking plate to separate the locking plate from the case.
Figure 5C:
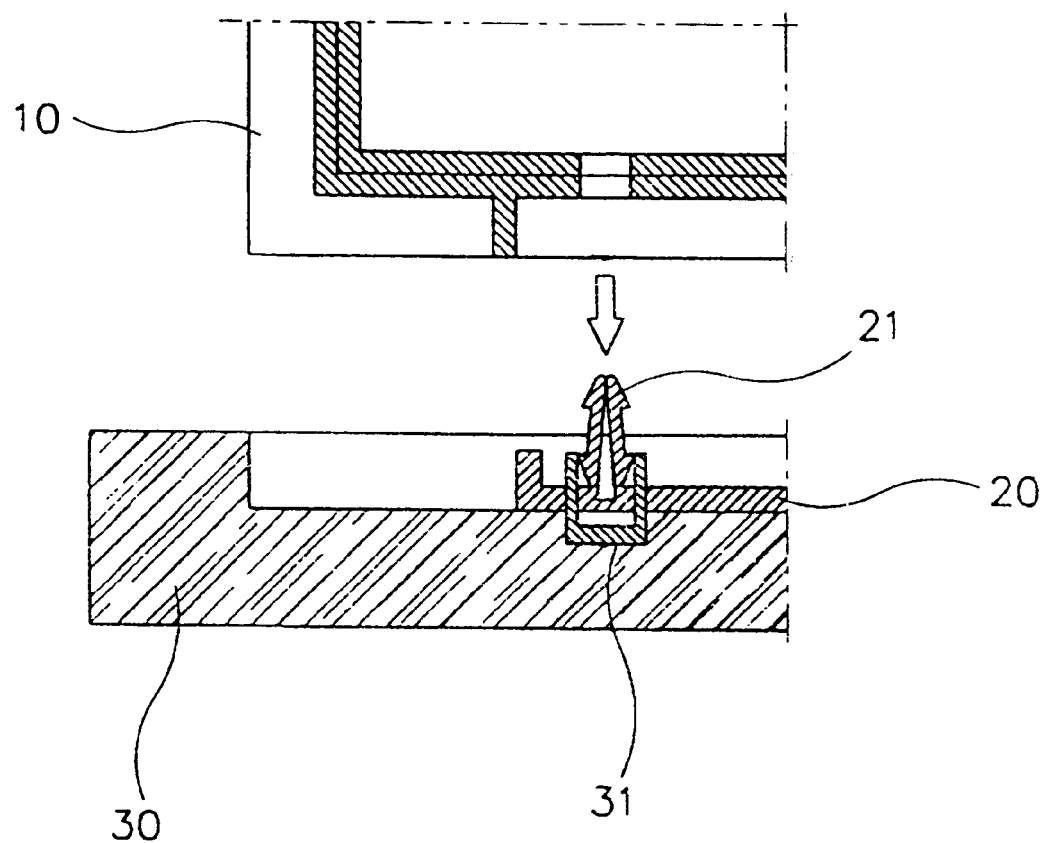
FIG. 5c is a partial sectional view which shows the case, the locking plate and the opening key fixture after the locking plate is separated from the case.

FIGS. 5a, 5b and 5c displays how to unlock the plate 20. When a customer brings the case 10 with the locking plate 20 and an alarm label 22 to a seller, the seller may remove the lock plate 20 with the opening key fixture 30. The seller can align the key holes 26 of the locking plate 20 with the keys 31 of the opening key fixtures 30 and press down the case 10 to insert the keys 31 into the key holes 26 as shown in FIG. 5a.

The releasing face 24 is tapered and thus, the keys 31 cause the releasing face 24 to move inwardly so that the width of the locking face 23 of the protrusions 21 becomes narrower than the diameter of the joint holes 14 as shown in FIG. 5b. Then, the seller moves the case 10 up, and the protrusions 21 can be pull out the joint holes 14. Thus, the locking plate 10 can be separated from the case 10 as shown in FIG. 5c, and the seller can open the cover 12.

Thus, the lock plate 20 of the present invention can be easily separated from the case as described in the above and the lock plate 20 may be used to lock another case.

According to the locking system of the present invention, it is very easy to display the case by standing it on the shelf and to save the displaying space since the locking plate is fitted with the main side of the case between the guarding tabs and thus, there is no obstacles on the outer surface of the case.

Further, according to the present invention, it is possible to prevent the enclosed tape from being stolen from the case, and to discourage the theft of the case itself.

In this specification, the term "tape storage case" means a case for containing an article such as a videotape, a cassettes tape, a compact disc, a CD-ROM, a DVD, a game pack, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A locking device for a cassette tape case, comprising:
   a panel sized to be attached to a surface of a cassette tape case; and
   a plurality of longitudinal protrusions vertically projecting from the panel, each of the protrusions comprising:
   a proximal section tapered toward the panel with a step, a tapered end of the proximal section being directly attached to the panel; and
   a distal section tapered away from the panel with a step;
   a middle section between the proximal and distal sections.

2. The locking device as defined in claim 1, wherein the protrusions are arranged in pairs, wherein each protrusion in each pair has a flat surface in the length thereof, and wherein the flat surfaces of the paired protrusions face each other with a gap therebetween.

3. The locking device as defined in claim 2, wherein the gap is configured as sufficient to allow the paired protrusions to tilt toward each other.

4. The locking device as defined in claim 1, wherein the panel has a plurality of slits, wherein each of the slits is located close to one of the protrusions such that a key configured to pass through the slit can contact the proximal tapered section, thereby flexing the protrusion.

5. The locking device as defined in claim 4, wherein each of the slits forms an arch around the attachment of one of the proximal sections of the closely located protrusion to the panel.

6. The locking device as defined in claim 1, further comprising a label attached to the panel, the label is adapted to be read when passing through a surveillance system.

7. An anti-theft cassette tape case, comprising:

a cassette tape case comprising a body and a cover, the cover comprising a locking surface configured to overlap a surface of the body when the case is locked, wherein a plurality of holes are formed on both of the locking surface and the surface of the body so that the holes can be overlapped for the locking of the case;

a panel configured to fit to the locking surface of the cover;

a plurality of protrusions vertically projecting from the panel, the protrusions are arranged in pairs on the panel so that each pair of the protrusions can be inserted into each of the overlapping holes of the locking surface and the surface of the body; and each of the protrusions comprising:

a proximal section tapered toward the panel with a step, a tapered end of the proximal section being directly attached to the panel; and a distal section tapered away from the panel with a step; and a middle section between the proximal and distal sections.

8. The anti-theft container as defined in claim 7, wherein the panel has a plurality of slits, wherein each of the slits is located close to the proximal section of each protrusion and configured to allow a key to pass therethrough and contact the proximal section.

9. The locking device as defined in claim 8, wherein each of the slits forms an arch around the attachment of one of the proximal sections to the panel.

10. The locking device as defined in claim 7, further comprising a label attached to the panel, the label is adapted to be read when passing through a surveillance system.

\* \* \* \* \*